(12) United States Patent  (10) Patent No.: US 7,665,142 B2
Yamamura  (45) Date of Patent: Feb. 16, 2010

(54) IMAGE PROCESSING APPARATUS AND IMAGE FORMING APPARATUS

(75) Inventor: Toshimi Yamamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1073 days.

(21) Appl. No.: 11/048,785

(22) Filed: Feb. 3, 2005

(65) Prior Publication Data

US 2005/0185972 A1  Aug. 25, 2005

(30) Foreign Application Priority Data

Feb. 5, 2004  (JP) ............................. 2004-029854

(51) Int. Cl.
*H06F 7/04* (2006.01)
*H06F 17/30* (2006.01)
*H06F 7/16* (2006.01)

(52) U.S. Cl. .......................................... 726/26; 726/33

(58) Field of Classification Search ................. 380/206, 380/200–242; 705/57; 726/26, 33
See application file for complete search history.

(56) References Cited

U.S. PATENT DOCUMENTS

| | | | | |
|---|---|---|---|---|
| 5,216,724 A | * | 6/1993 | Suzuki et al. ................ | 382/135 |
| 5,321,470 A | * | 6/1994 | Hasuo et al. ................. | 399/366 |
| 5,565,962 A | * | 10/1996 | Yoshimoto ................... | 399/366 |
| 5,659,628 A | | 8/1997 | Tachikawa et al. | |
| 5,737,100 A | * | 4/1998 | Funada et al. ................ | 358/501 |
| 5,742,408 A | * | 4/1998 | Funada et al. ................ | 358/501 |
| 6,144,835 A | * | 11/2000 | Inoue et al. .................. | 399/366 |
| 7,129,973 B2 | * | 10/2006 | Raynor ..................... | 348/231.3 |

FOREIGN PATENT DOCUMENTS

| | | |
|---|---|---|
| EP | 0 506 469 A2 | 9/1992 |
| EP | 0 617 545 A1 | 9/1994 |
| JP | 6-62238 | 3/1994 |
| JP | 6-125459 | 5/1994 |
| JP | 9-186870 | 7/1997 |
| JP | 11-346309 | * 12/1999 |
| JP | 11-346309 | * 12/1999 |
| JP | 2001-144940 | * 5/2001 |
| JP | 2001-292315 | * 10/2001 |
| JP | 2001-292315 | * 10/2001 |
| JP | 2004-15120 | 1/2004 |
| JP | 2004-112627 | 4/2004 |

* cited by examiner

*Primary Examiner*—Kambiz Zand
*Assistant Examiner*—Dant B Shaifer Harriman
(74) *Attorney, Agent, or Firm*—Oblon, Spivak, McClelland, Maier & Neustadt, L.L.P.

(57) ABSTRACT

An image processing apparatus and an image forming apparatus can easily handle various kinds of documents including a special document and a normal document without problems of counterfeit by copy. The image processing apparatus and the image forming apparatus have a circuit for processing image data. A signal generating circuit generates a signal to prevent an image formation of a specified document. The signal generating circuit is detachably attached to the circuit for processing image data.

8 Claims, 17 Drawing Sheets

IMAGE PROCESSING APPARATUS AND IMAGE FORMING APPARATUS

BACKGROUND OF THE INVENTION

1. Field of the Invention

The present invention generally relates to an image processing apparatus and an image forming apparatus having means for preventing an image formation of a special document such as a paper money, a security paper (policy form) or the like.

2. Description of the Related Art

With advanced development in an image processing technology and image forming technology, it has become capable of performing an image formation elaborately such that a copied paper money and a copied security paper printed by a color copy machine are not easily distinguishable from a real paper money and a real security paper. For this reason, a technique has been developed to discriminate a special document such as a paper money to prevent a copy of the special document, and a copy machine having a special document discriminating function has been developed by providing a function to discriminate a special document to a copy machine.

As such a copy machine, there is known by Japanese Laid-Open Patent Application No. 2001-292315 a copy machine, in which a paper money recognition control circuit recognizes, when a paper money as a special document is read by a scanner, image data of the read image as an image of a paper money; a notification is sent to a third party that a copy of a special document is being performed; a counter value for setting a time period from a power supply to a start of a starting process is increased; an error message is displayed on an LCD display part; and all processes are stopped.

Additionally, there is known by Japanese Laid-Open Open Patent Application No. 2001-144940 a copy machine as a copy machine having a special document discriminating function, in which a forgery determination processing module of a scanner driver compares image data generated by reading a document by a scanner with image data of a specific document so as to determine a level of coincidence; and a forgery prevention control module processes the image data generated by a scanner base on a result of the determination.

Further, there is known a copy machine by Japanese Laid-Open Patent Application No. 6-125459, which stores feature data of special documents of which copy is prevented in accordance with kinds of images of the special documents; extracts a feature image part from the input image data; compares the image data of the extracted image part with the stored feature data; prohibits a copy operation if a similarity as a result of the comparison corresponds to a predetermined first similarity; and providing a mark onto a recording paper if the similarity corresponds to a second similarity.

The invention disclosed in the above-mentioned Japanese Laid-Open Patent Application No. 2001-292315 prohibits a copy operation when an original document is determined as a special document. The invention disclosed in the above-mentioned Japanese Laid-Open Patent Application No. 2001-144940 processes copy image data when an original is determined as a special document. The invention disclosed in the above-mentioned Japanese Laid-Open Patent Application No. 6-125459 prohibits a copy operation or performs marking on a print paper in accordance with a degree of determination that an original document is a special document.

As mentioned above, the invention disclosed in each of the above-mentioned patent documents discriminates a special document, and, thereafter, takes measures for a forgery of the special document such as prohibiting a copy or processing a copy image based on a result of the discrimination. That is, although there is a difference in an accuracy of discrimination, each of the copy machines disclosed in the above-mentioned patent documents takes measures for a forgery of a special document on the assumption that the discriminating function of a special document is functioning normally.

However, since a copy machine having a special document discriminating function is capable of making a copy of a normal document without any restriction, if the special document discriminating function is made inactive, a special document may be copied in the same manner as a normal document.

Additionally, in recent years, a special document has not been limited to a conventional paper money or security paper, and has been expanded to many kinds of papers such as a gift certificate, a toll-road ticket, etc. However, the copy machines with a special document discriminating function disclosed in the above-mentioned patent documents are made in consideration of specific special documents, and are not oriented to a copy machine having a special document discriminating function, which is capable of acting according to various kinds of special documents.

Further, in recent years, users of copy machines tend to request preferably a copy machine having a cost advantage that has only necessary functions in accordance with circumstances of a copy machine of user's own use. However, since the copy machines having a special document discriminating function disclosed in the above-mentioned patent documents are always provided with the special document discriminating function as a general function, a function change cannot be made in response to the user', s needs.

SUMMARY OF THE INVENTION

It is a general object of the present invention to provide an improved and useful image processing apparatus and image forming apparatus in which the above-mentioned problems are eliminated.

A more specific object of the present invention is to provide an image processing apparatus and an image forming apparatus which can easily handle various kinds documents including a special document and a normal document.

Another aspect of the present invention is to provide an image processing apparatus and an image forming apparatus which can provide information regarding a state of a special document discriminating function.

A further object of the present invention is to provide an image processing apparatus and an image forming apparatus which can prevent a special document discriminating function from being inactivated.

In order to achieve the above-mentioned objects, there is provided according to the present invention An image processing apparatus comprising: a circuit for processing image data; and at least one signal generating circuit for generating a signal to prevent an image formation of a specified document, wherein the signal generating circuit is detachably attached to the circuit for processing image data.

In the image processing apparatus according to the present invention, a plurality of the signal generating circuits may be provided so that one of the signal generating circuits is selectable in accordance with the specified document.

In the image processing apparatus according to the present invention, the signal generating circuit may include a processor and a memory, and may be operated according to a process program that corresponds to the specified document and is stored in the memory.

The image processing apparatus according to the present invention may further comprise: means for detecting an operation of the signal generating circuit; and at least one of means for storing information regarding the state of the operation in accordance with a result of the detection, means for announcing the state of the operation in accordance with a result of the detection and means for stopping an image processing operation in accordance with a result of the detection. The means for detecting an operation of the signal generating circuit may include means for detecting an exchanging function to exchange specific information of the signal generating circuit.

Additionally, there is provided according to another aspect of the present invention an image forming apparatus comprising: image forming means for forming a visible image based on image data; and one of the image processing apparatuses mentioned above.

According to the present invention, the image processing apparatus or the image forming apparatus having the image processing apparatus can handle various kinds of documents including a normal document and a special document without problems of counterfeit by copy. Additionally, it is easy to know whether a discriminating function of a special document is valid or invalid. Further, an occurrence of an inactivated state where the special document discriminating function is inactivated or invalidated can be prevented.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of a digital copy machine as an image forming apparatus according to the present invention.

Figure 1:
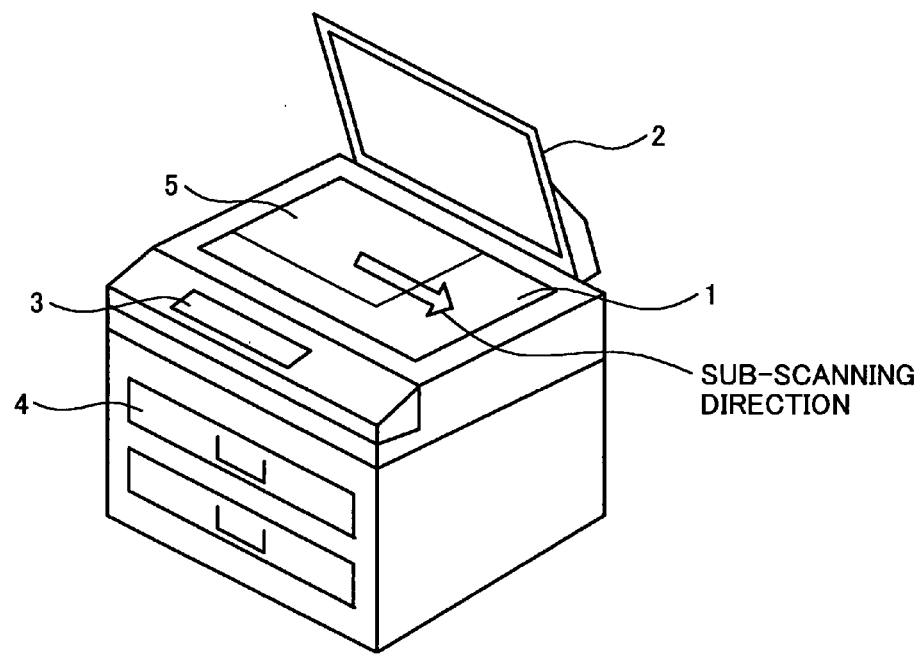
FIG. 1 is a perspective view of a digital copy machine according to the present invention.

FIG. 1 is a perspective view of a digital copy machine according to the present invention. In FIG. 1, the digital copy machine comprises a document table 1, a document press 2, an operation and display part 3 and a paper cassette 4. Although not shown in FIG. 1, an optical reading unit (scanner) is installed under the document table 1. An original document 5 is placed on the document table 1.

Figure 2:
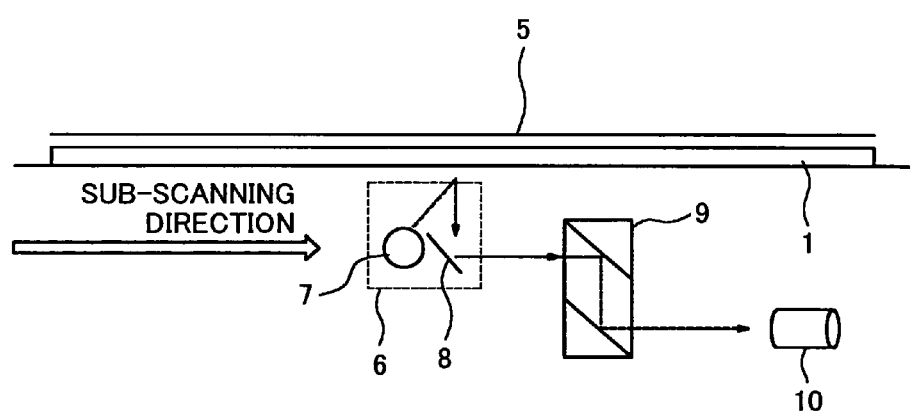
FIG. 2 is an illustrative side view of a scanner of the digital copy machine viewed from a front side of the digital copy machine according to an example of the present invention.

FIG. 2 is an illustrative side view of the scanner of the digital copy machine viewed from a front side of the digital copy machine. In FIG. 2, the scanner 6 comprises a light source 7, a scanning mirror 8, an optical unit 9 having lenses and reflective mirrors, and an photoelectric transducer such as a charge coupled device (CCD) 10. The scanner 6 reads the original document 5 placed on the document table 1 by moving in a sub-scanning direction (a left-to-right direction in the drawing) while scanning a light beam of the light source 7 in a main scanning direction (a front side to a back side of the drawing) on the original document 5 by being controlled by a control motor (not shown in the figure).

Figure 3:
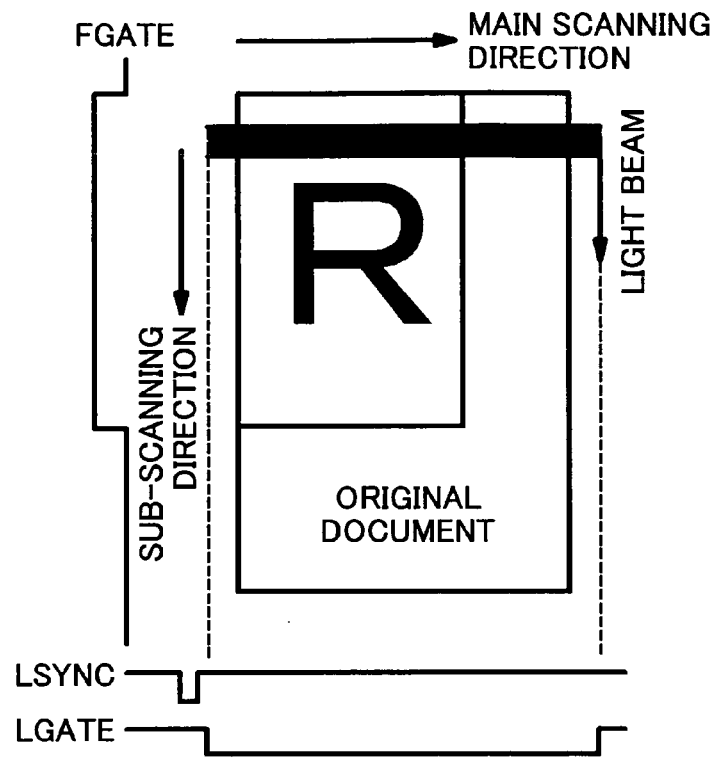
FIG. 3 is an illustration showing a relationship between an original document and control signals according to an example of the present invention.

FIG. 3 is an illustration showing a relationship between an original document and control signals. In FIG. 3, a signal FGATE is a sub-scanning signal which represents an image range of the light source 7 and the scanning mirror 8 in the sub-scanning direction. A signal LSYNC is a main scanning synchronization signal which indicates a start point of a line in a reading direction of the charge coupled device 10, that is, the main scanning direction. A signal LGATE is a main scanning signal representing and image range of an original-document reading surface in the main scanning direction.

Figure 4:
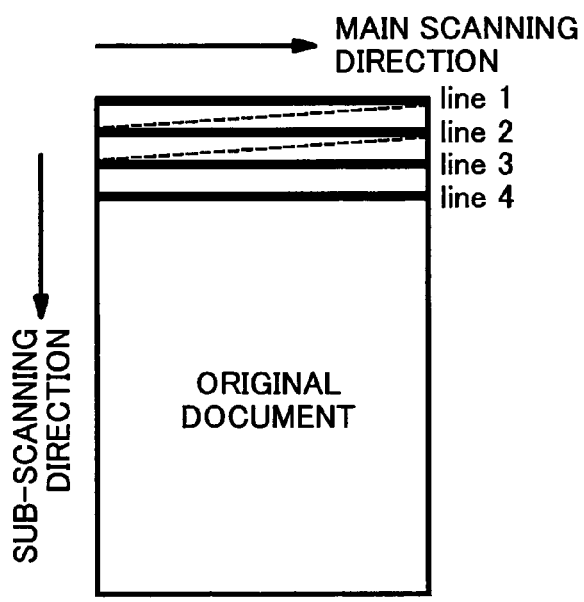
FIG. 4 is an illustration of the original document indicating a main scanning direction and a sub-scanning direction according to an example of the present invention.

FIG. 4 is an illustration of the original document indicating the main scanning direction and the sub-scanning direction. Ad shown in FIG. 4, scanning of line 1 is performed in the main scanning direction with a start point of the signal LSYNC as a reference, and scanning of line 2 is performed is performed in the main scanning direction by the light source 7 and the scanning mirror 8 moving in the sub-scanning direction. Thereafter, scanning is sequentially performed in the same manner along line 3, line 4 and so on.

Figure 5:
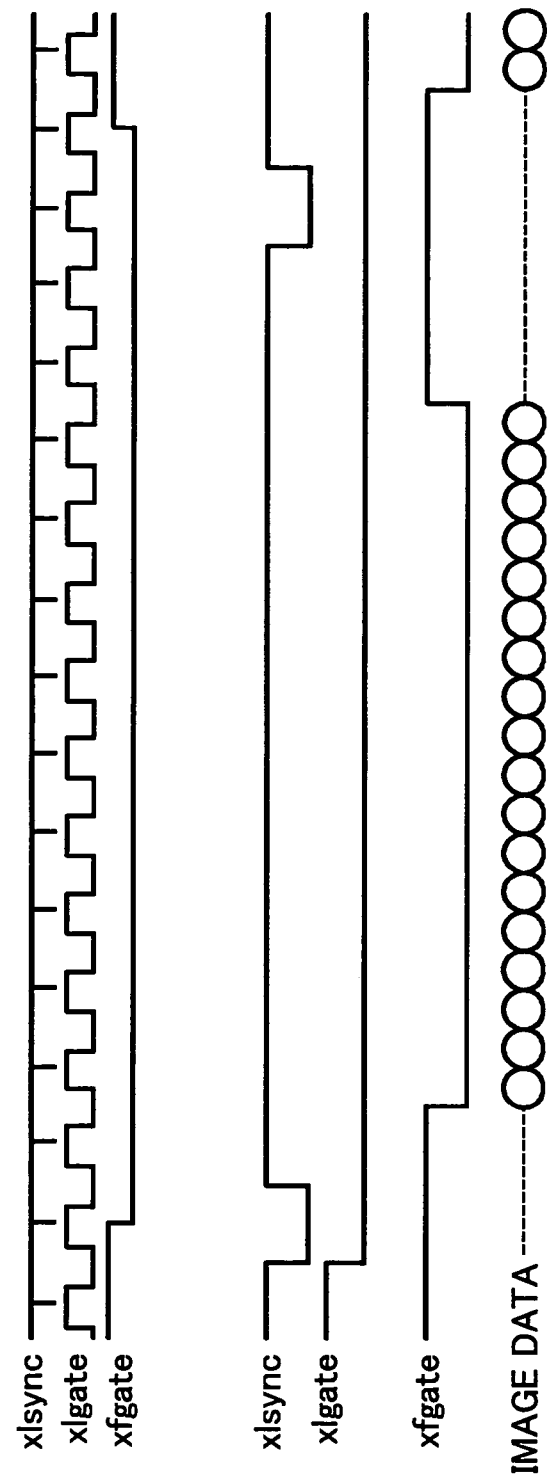
FIG. 5 is a time chart showing a relationship between an image data signal and main scanning and sub-scanning image range signals according to an example of the present invention.

FIG. 5 is a time chart showing a relationship between image data signal and main scanning and sub-scanning image range signals. Triggered by the above-mentioned signal LSYNC, two-dimensional document image is converted into image data signal according to the signals FGATE and LGATE. The image data signal is processed by an image processing part of the digital copy machine mentioned later.

Figure 6:
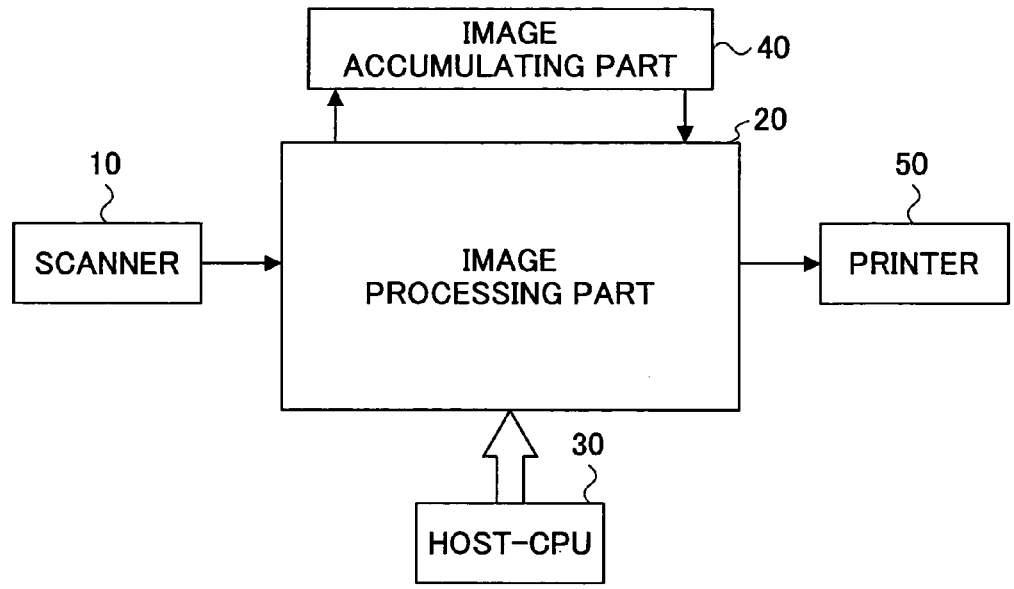
FIG. 6 is a block diagram of major parts of the digital copy machine shown in FIG. 1 according to an example of the present invention.

FIG. 6 is a block diagram of major parts of the digital copy machine shown in FIG. 1. As show in FIG. 6, the digital copy machine comprises a scanner 10, an image processing part 20, a main control part (Host-CPU) 30, an image accumulating part 40 and a printer 50. Image data generated by reading an original document by the scanner 10 and converted into an electric signal by the above mentioned photoelectric transducer (charge coupled device: CCD) is input to the image processing part 20 so as to be processed. The image accumulating part 40 has a semiconductor memory and a magnetic-disk type memory. The image accumulating part 40 temporarily acquires a memory area for image edition corresponding to one sheet of print paper, and receives the processed image data from the image processing part 20. An amount of image information accumulated in the image accumulating part 40 is further increased by a compression and decompression function of the image control part 20. Finally, print data is produced on a page unit basis, and is input to the printer 50. The printer 50 is provided with image forming means of an electrophotography system so as to turn the image data signal of a page unit into a visible image and output by transferring the visible image onto a print paper. The main control part 30 controls an operation of each constitutional part in accordance with a predetermined program during the above-mentioned image forming operation.

Figure 7:
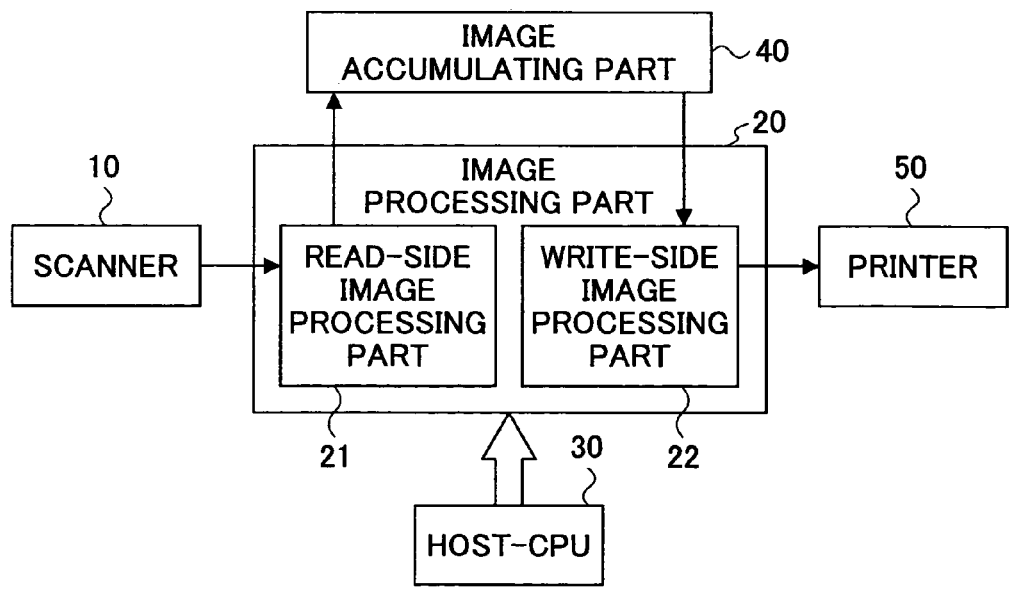
FIG. 7 is a block diagram for explaining an image processing mode in an image processing part shown in FIG. 6 according to an example of the present invention.

A description will now be given of the processing of the image data signal in the image processing part 20 and a prohibition of an image formation of a special document. FIG. 7 is a block diagram for explaining an image processing mode in the image processing part 20 shown in FIG. 6. As shown in FIG. 7, the image processing part 20 includes a read-side image processing part 21 and a write-side image processing part 22 so as to take a partial charge of the image processing. The image data signal received from the scanner 10 is processed by the read-side image processing part 21, which mainly corrects an influence due to scanner characteristics, and, thereafter, temporarily accumulated in the image accumulating part 40. The image data in the image accumulating part 40 is read by the write-side image processing part 22, and write-side image processing, such as a gradation (image quality) process, a filtering process, a gradation conversion according to a gamma curve, etc., is applied to the read image data signal in accordance with an output data format.

Figure 8:
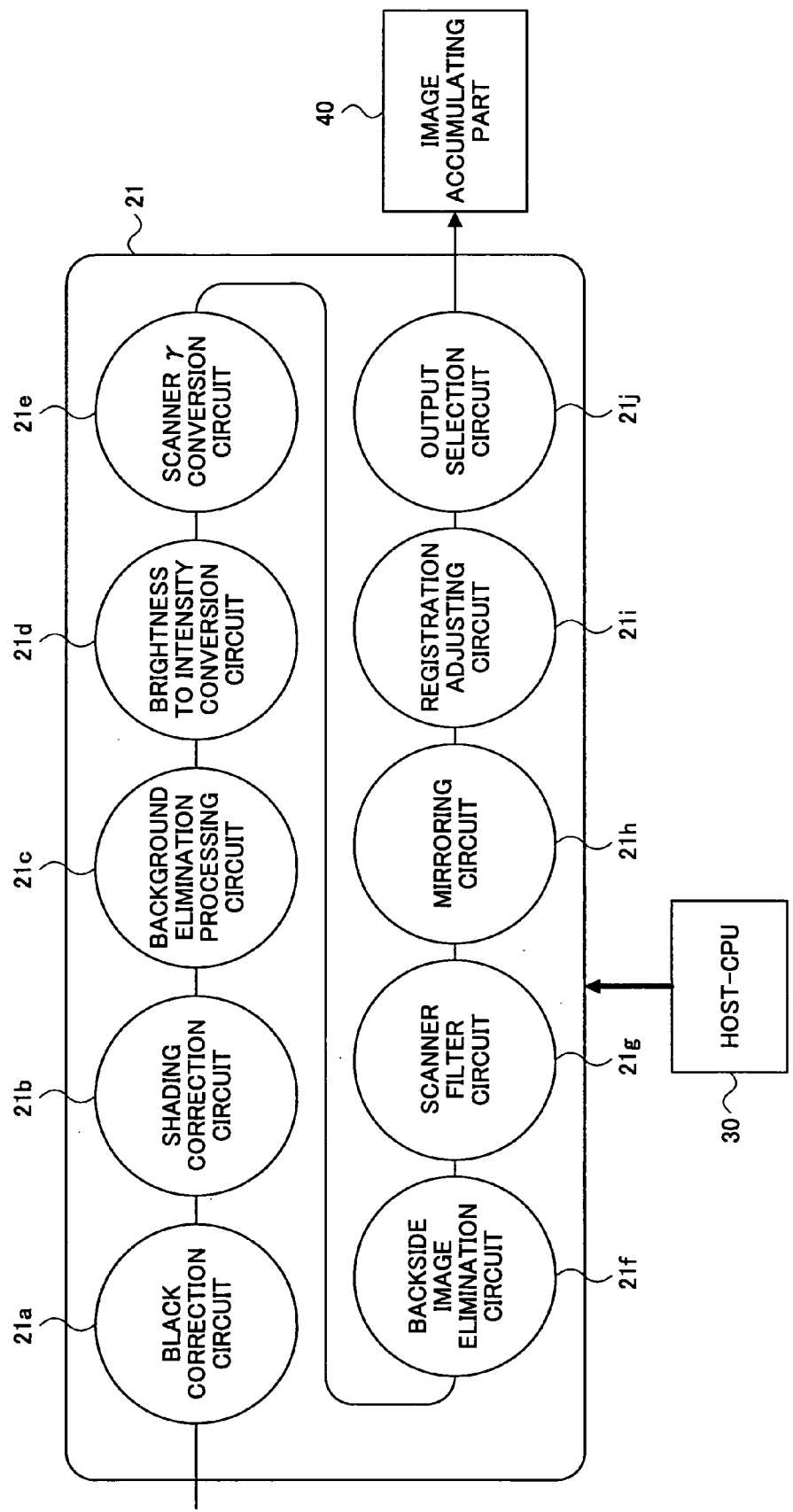
FIG. 8 is a block diagram of a read-side image processing part to perform an image processing operation according to an example of the present invention.

FIG. 8 is a block diagram of the read-side image processing part 21 to perform an image processing operation. Referring to FIG. 8, the image data signal input from the scanner 10 is subjected to a black level correction by a black correction circuit 21a, and is subjected to a correction of a light distribution of the light source 7 and a white reading level by a shading correction circuit 21b. Then, a low-level background is deleted by following the background level of the read image data by a background elimination processing circuit 21c, and the image data signal, which has been processed according to a brightness level, is converted into an image data signal based on an intensity level by a brightness-to-intensity conversion circuit 21d. Thereafter, a read brightness characteristic of the scanner 6 is corrected by a scanner gamma conversion circuit 21e, a low-level image is eliminated by a backside image eliminating circuit 21f so as to eliminate a low-intensity backside image of the original document, and, then, a resolution, which has been degraded by the scanner, is corrected by a scanner filter circuit 21g. Thereafter, a mirroring is performed by a mirroring circuit 21h so as to match the main scanning direction if, for example, a sheet through feeding device is used for a reading system, and a leading end of the original document, which is placed on the document table or fed by a sheet through feeding device, is aligned with a leading end position of effective image data of the image data generated by the scanner (CCD) 10 by a registration adjusting circuit 21i, and, finally, a selection of an output corresponding to a data format of an outputting unit is performed by an output selection circuit 21j.

Figure 9:
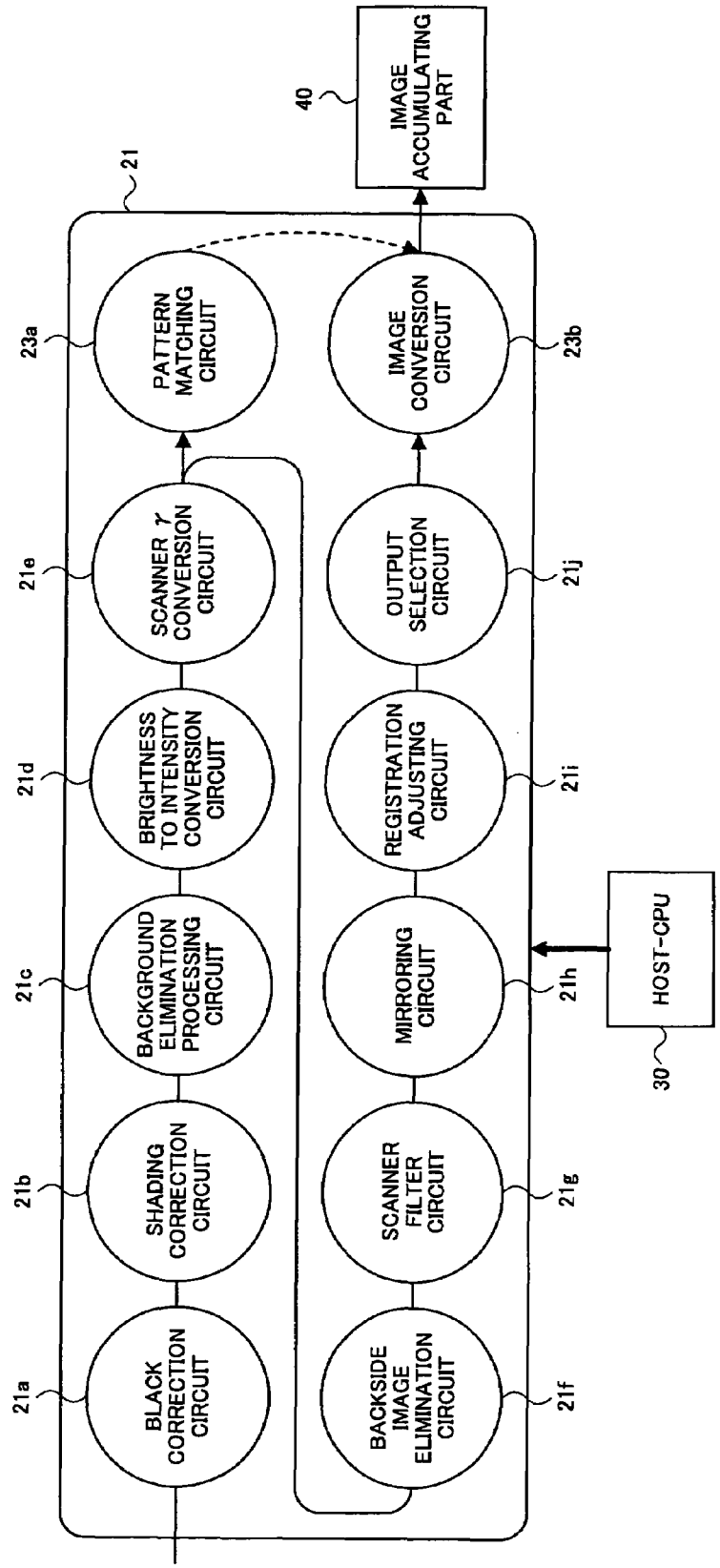
FIG. 9 is a block diagram of the read-side image processing part having an image formation prohibiting circuit for prohibiting an image formation of a special document according to an example of the present invention.

A description will now be given of a prohibition of an image formation of a special document. FIG. 9 is a block diagram of the read-side image processing part 21 having an image formation prohibiting circuit for prohibiting an image formation of a special document. In FIG. 9, a structure of the black correction circuit 21a through the output selection circuit 21j is the same as that shown in FIG. 8. In order to prevent an image formation of a special document from being performed, the read-side image processing part 21 shown in FIG. 9 is provided with a pattern matching circuit 23a after the scanner gamma conversion circuit 21e and an image conversion circuit 23b after the output selection circuit 21j. That is, the pattern matching circuit 23a and the image conversion circuit 23b are incorporated into the read-side image processing part 21 together with other circuits shown in FIG. 8.

The pattern matching circuit 23a can be any pattern matching circuit generally used for preventing an image formation of a special document. For example, the pattern matching circuit 23a comprises: an image detection circuit that inputs the digitally processed image data and extracts a feature image portion (comparing portion); a memory such as a ROM for storing the feature data in accordance with a kind of an image of a special document beforehand; and comparison circuit that compares the comparing portion extracted by the image detection circuit with the feature date in the memory so as to acquire a similarity therebetween. According to the above-mentioned structure, when the digitally processed image data is input to the image detection circuit, the image detection circuit extracts the comparing portion. That is, the image detection circuit extracts feature data (for example, a sealed portion) of a special document such as a paper money, a security paper, etc., from the image data of the copy image data. After the feature data is extracted, the feature data stored in the memory beforehand is read, and the extracted feature data is compared with the read feature data, and the similarity is determined. The image conversion circuit 23b can also be an image conversion circuit generally used. For example, a circuit that converts digitally processed image data into other kinds of image data or converts a white portion or a black portion into a different color portion may be used.

In the structure of FIG. 9, an output of the scanner gamma conversion circuit 21e is branched and a part of the image data signal is input to the pattern matching circuit 23a so as to detect a special document. A result of the detection is supplied to the image conversion circuit 23b so as to convert the image data signal output from the output selection circuit 21j.

First Embodiment

In the present embodiment, the pattern matching circuit is separated, as an independent device, from the read-side image processing part 21 so that the pattern matching circuit part is detachably attached to the read-side image processing part 21. In this case, the pattern-matching device may have a pattern matching circuit and an output conversion circuit or have only the pattern matching circuit and the function of the output conversion circuit may be handed to existing other circuits.

Figure 10:
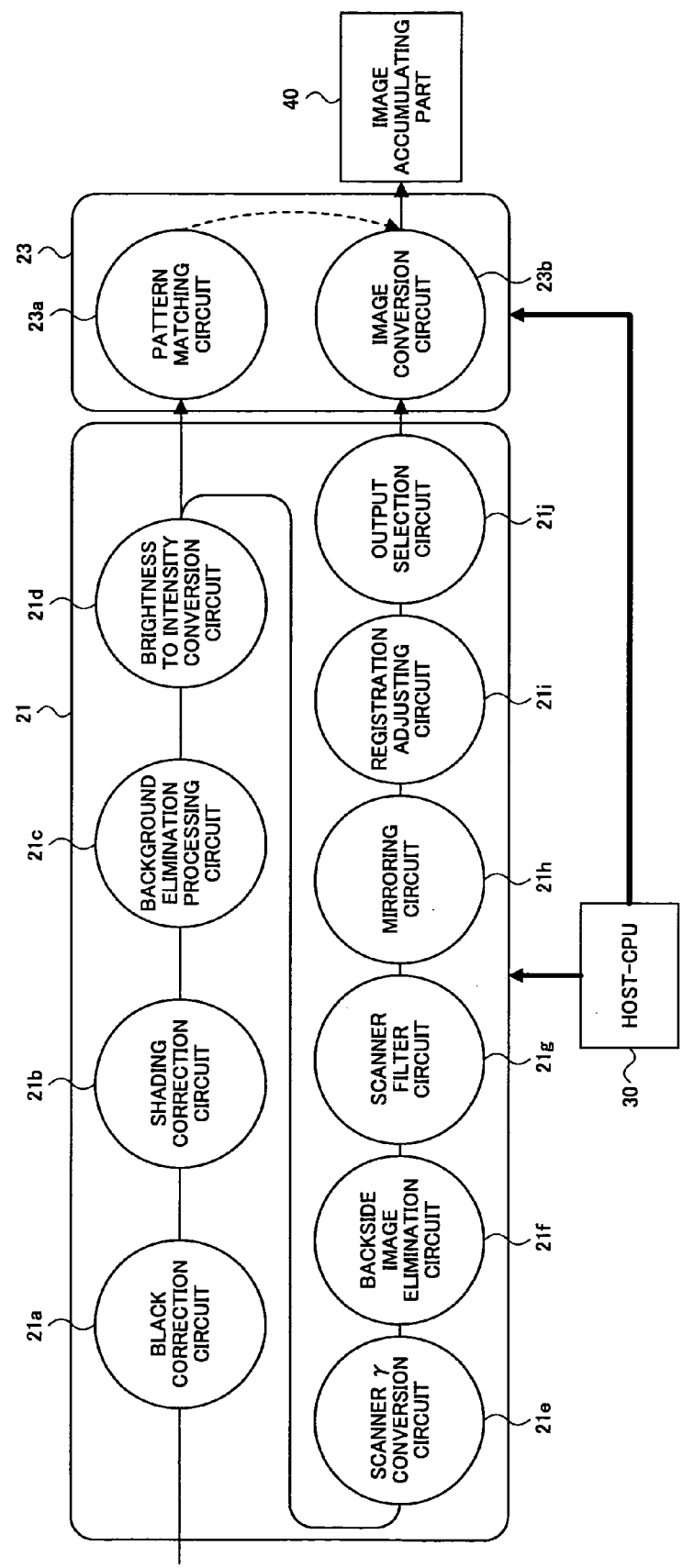
FIG. 10 is a block diagram of a structure in which a pattern matching device having the pattern matching circuit and an output conversion circuit is provided separately from the read-side image processing part according to an example of the present invention.

FIG. 10 is a block diagram of a structure in which a pattern matching device having the pattern matching circuit and an output conversion circuit is provided separately from the read-side image processing part 21. In FIG. 10, although the pattern matching device 23 comprises a pattern matching circuit 23a, an output conversion circuit 23b and a ROM which stored feature patterns, the pattern matching device 23 may be configured and arranged to be detachably attached to the read-side image processing part 21.

Figure 11:
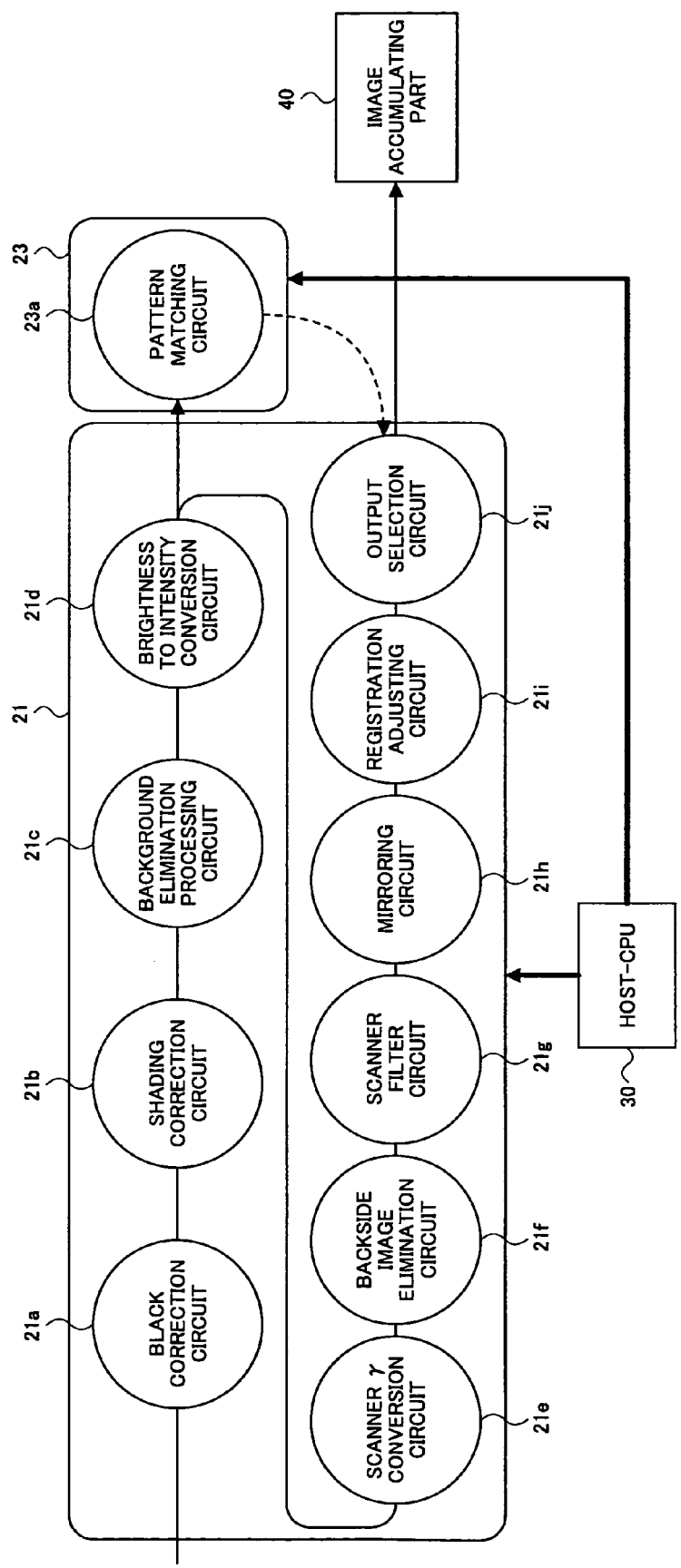
FIG. 11 is a block diagram of a structure in which a pattern matching device having only a pattern matching circuit is provided separately from the read-side image processing part according to an example of the present invention.

FIG. 11 is a block diagram of a structure in which a pattern matching device having only the pattern matching circuit is provided separately from the read-side image processing part 21. In FIG. 11, the pattern matching device 23 has only the pattern matching circuit 23a, and is configured and arranged to be detachably attached to the read-side image processing part 21. In this case, the function of the output conversion circuit is handed to the output selection circuit 21j.

Although it is mentioned that the pattern matching device 23 is located between the read-side image processing part 20 and the image accumulating part 40, the pattern matching device 23 may be arranged as follows.

(1) Arranging at any position between the circuits of the read-side image processing circuit.

(2) Arranging after the scanner and before the read-side image processing part.

(3) Arranging after the read-side image processing part and before an image accumulating part.

Figure 12A:
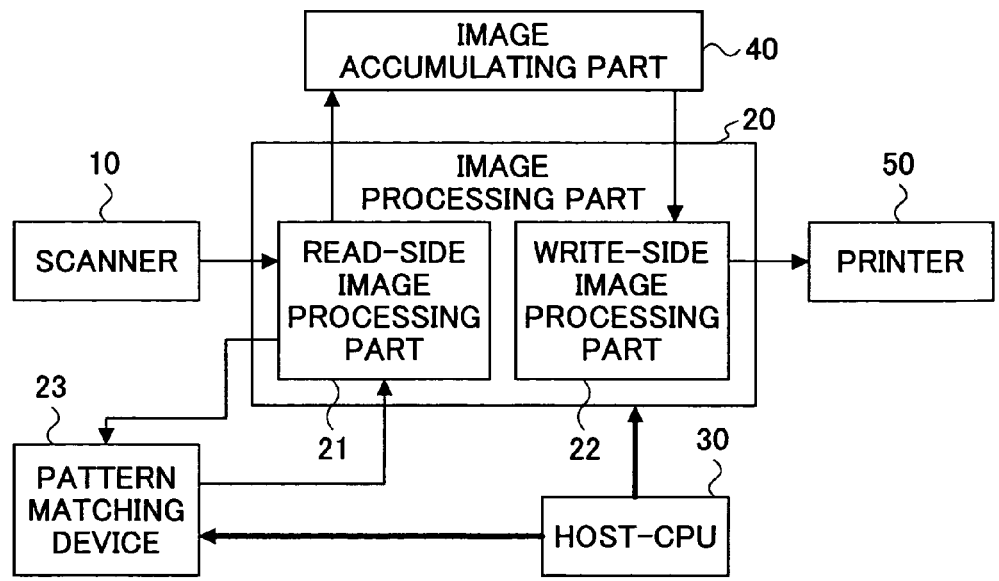
FIG. 12A is a block diagram showing an arrangement in which the pattern matching device is located between any adjacent two circuits according to an example of the present invention.
Figure 12B:
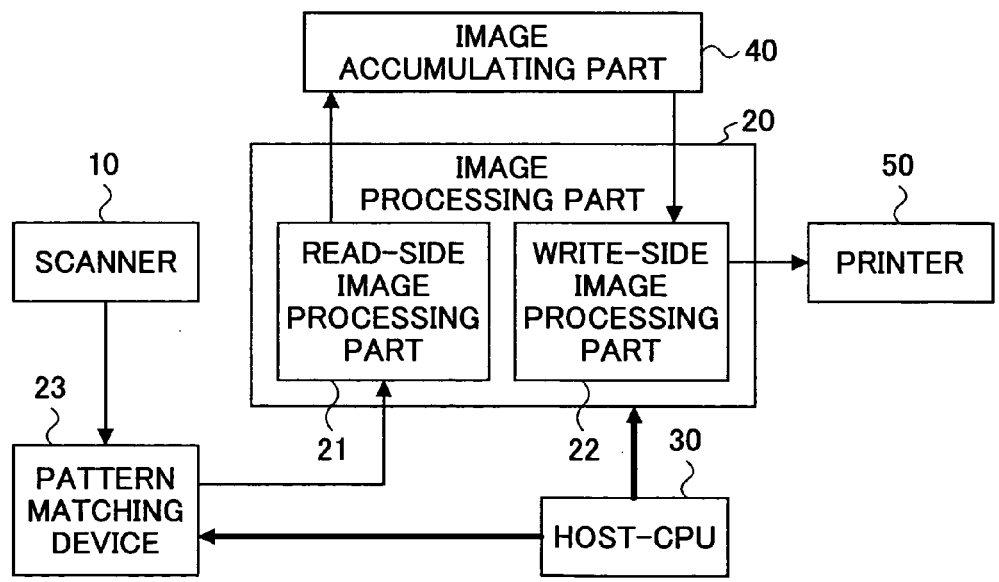
FIG. 12B is a block diagram showing an arrangement in which the pattern matching device is located after a scanner and before the read-side image processing part according to an example of the present invention.
Figure 12C:
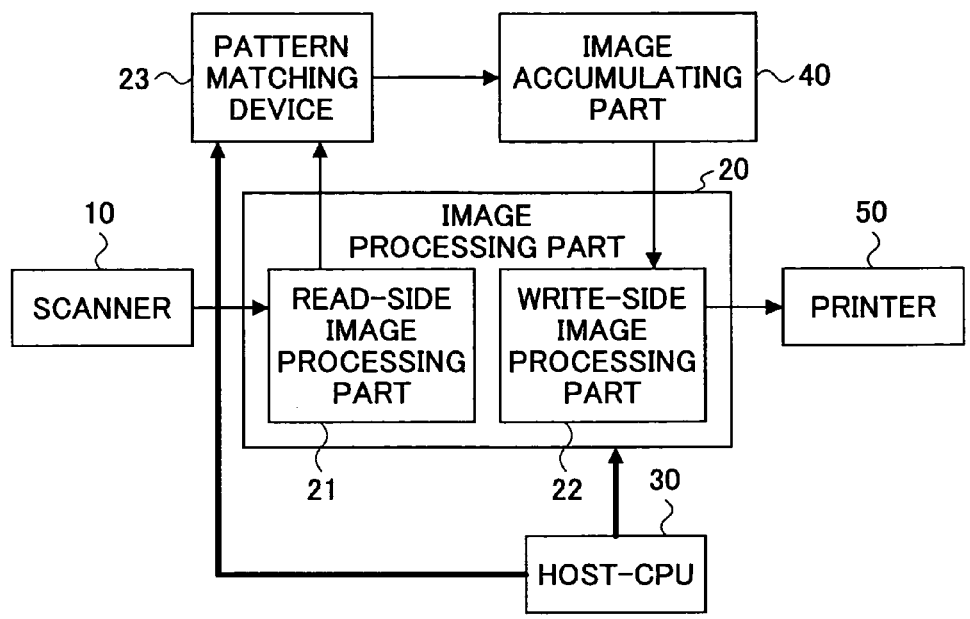
FIG. 12C is a block diagram showing an arrangement in which the pattern matching device is located after the read-side image processing part and before an image accumulating part according to an example of the present invention.

The above-mentioned arrangements of the pattern matching device are shown in FIG. 12A through 12C. FIG. 12A shows the arrangement in which the pattern matching device is located between any adjacent two circuits. FIG. 12B shows the arrangement in which the pattern matching device is located after the scanner and before the read-side image processing part. FIG. 12C shows the arrangement in which the pattern matching device is located after the read-side image processing part and before the image accumulating part. According to the above-mentioned variations in the arrangement of the pattern matching device, a degree of freedom in pattern detection is improved.

A description will be given of a control procedure of setting an operation of the pattern matching device. When the pattern matching device 23 is arranged at the locations in the circuit as mentioned above, the main control part 30 determines that the pattern matching device 23 is attached by detecting (a) contents of ports of the pattern matching device 23, (b) contents of ports of the image processing part 20 containing the read-side image processing part 21 to which the pattern matching device 23 is connected, or (c) identification (ID) information regarding a board on which the pattern matching device 23 is mounted. Based on the judgment mentioned above, an operation setting of the pattern matching device 23 is performed.

Figure 13:
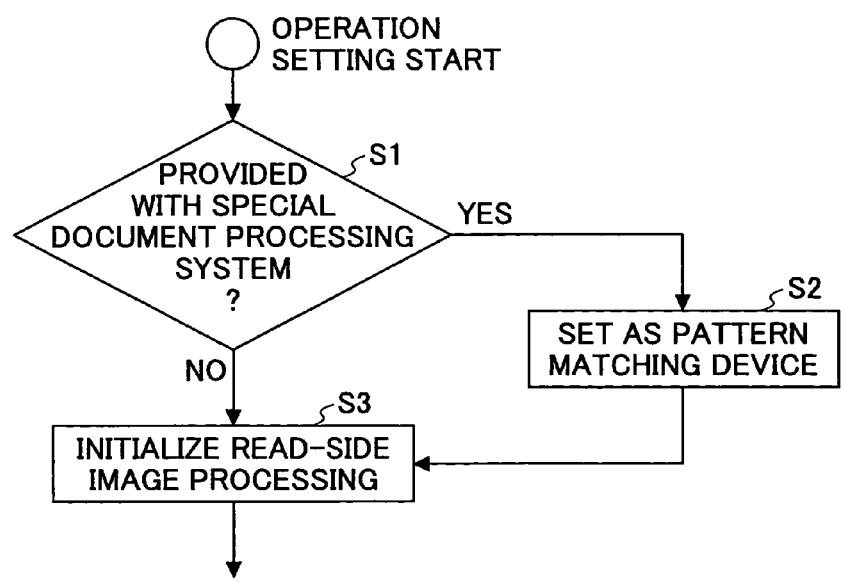
FIG. 13 is a flowchart of a procedure of setting an operation of the pattern matching device according to an example of the present invention.

FIG. 13 is a flowchart of a procedure of setting an operation of the pattern matching device 23. In FIG. 13, when operation setting of the pattern matching device 23 is started, the main control part 30 determines, in step S1, whether or not the pattern matching device 23 is provided, that is, whether or not a special document processing system is attached. If it is determined that the pattern matching device 23 is attached, an operation of the pattern matching device is set in step S2, and, then, an operation of the read-side image processing part 21 is set in step S3. On the other hand, if it is determined, in step S2, that the pattern matching device 23 is not attached, the routine proceeds to step S3 so as to set an operation of the read-side image processing part 21. It should be noted that an operation of the pattern matching 23 is set first and thereafter an operation of the read-side image processing part 21 is set when the pattern matching device is attached in the above-mentioned procedure, the order of setting may be reversed.

Second Embodiment

In the present embodiment, an arbitrary pattern matching device is selectable from among a plurality of matching devices so that prevention of an image formation of different special documents can be achieved. As examples of different special documents, there are Japanese Yen bills, one thousand Yen bill, five-thousand Yen bill, ten-thousand Yen bill, etc.

Figure 14:
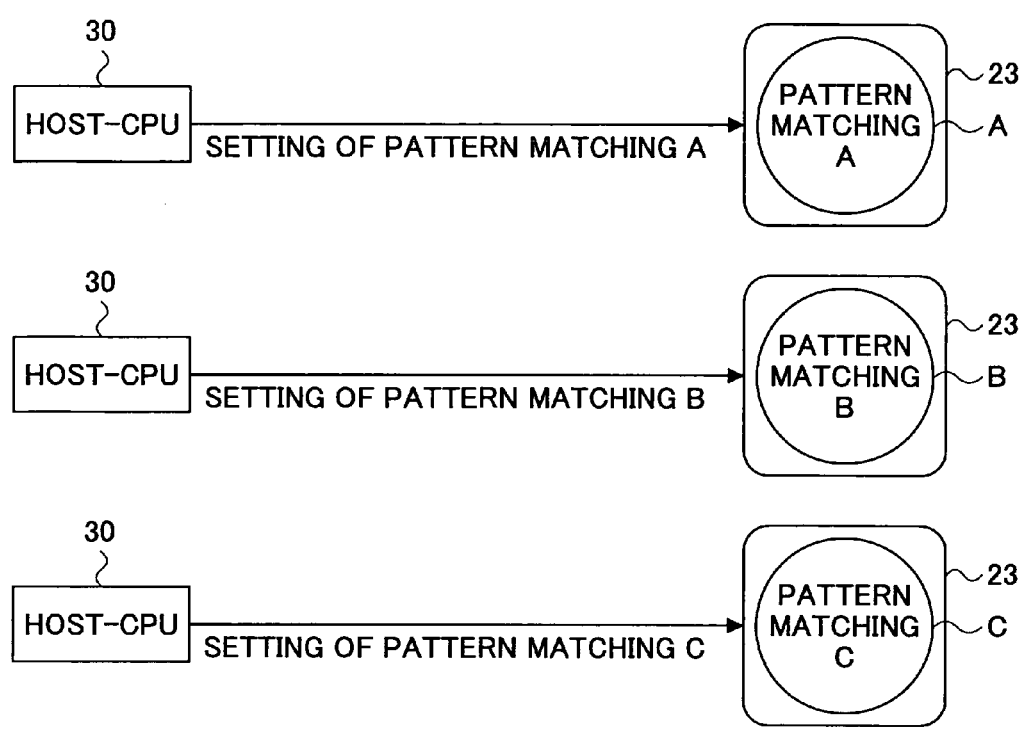
FIG. 14 is an illustration showing a concept of selection of a pattern matching device having a different feature pattern made by a main control part according to an example of the present invention.

FIG. 14 is an illustration showing a concept of selection of a pattern matching device having a different feature pattern made by the main control part. In FIG. 14, the pattern matching devices 23 are provided with the description patterns A, B and C corresponding to different special documents, respectively. The pattern matching devices 23 are provided, as mentioned above, at locations (a) between any adjacent circuits in the read-side image processing part, (b) after the scanner and before the read-side image processing part and (c) after the read-side image processing part and before the image accumulating part, respectively.

Thus, the main control part checks the locations of the pattern matching devices 23 by detecting the contents of ports of the pattern matching device 23 itself, the contents of the image processing part 20 containing the read-side image processing part 21 to which the pattern matching device 23 is connected or the identification (ID) information of a board on which the pattern matching device 23 is mounted. Then, appropriate operations are set to the checked pattern matching devices 23, respectively.

Figure 15:
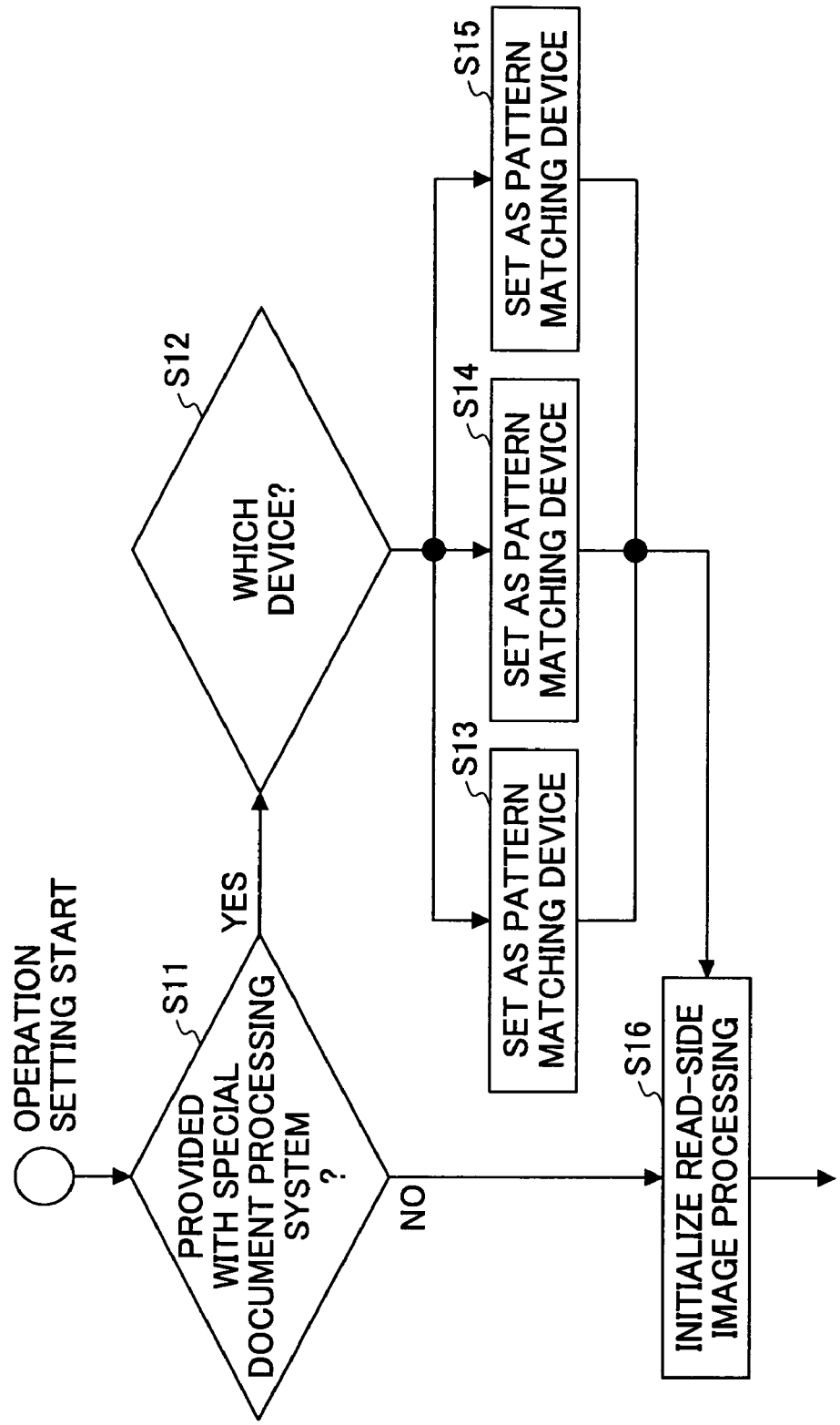
FIG. 15 is a flowchart of a procedure of setting an operation to each of the pattern matching devices having different feature patterns according to an example of the present invention.

FIG. 15 is a flowchart of a procedure of setting an operation to each of the pattern matching devices having different feature patterns. In FIG. 15, when operation setting of the pattern matching devices 23 is started, the main control part 30 determines, in step S11, whether or not one of the pattern matching devices 23 is provided, that is, whether or not a special document processing system is attached, by detecting the contents of ports of the pattern matching device 23 itself, the contents of the image processing part 20 containing the read-side image processing part 21 to which the pattern matching device 23 is connected and the identification (ID) information of a board on which the pattern matching device 23 is mounted. If one of the pattern matching devices 23 is attached, it is judged, in step S12, which of the pattern matching devices 23 is selected. Then, in steps S13, S14 or S15, an operation is set to one of the pattern matching devices 23 which is judged to be selected. Then, in step S16, an operation is set to the read-side image processing part 21. When it is determined, in step S11, that none of the pattern matching devices 23 is attached, the routine proceeds to step S16 so as to set an operation to the read-side image processing part 21.

Third Embodiment

Figure 16:
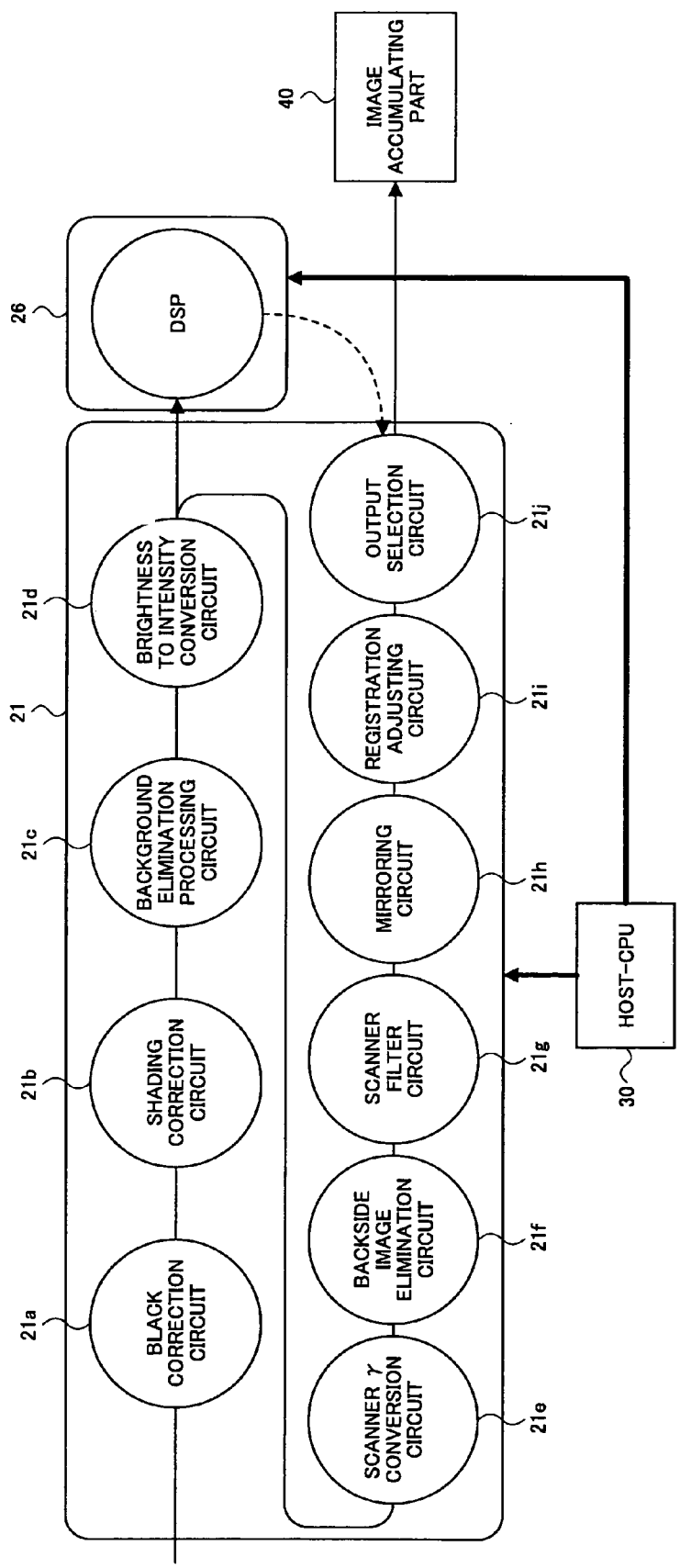
FIG. 16 is a block diagram of the read-side image processing part provided with a pattern matching device constituted by a digital signal processor according to an example of the present invention.
Figure 17:
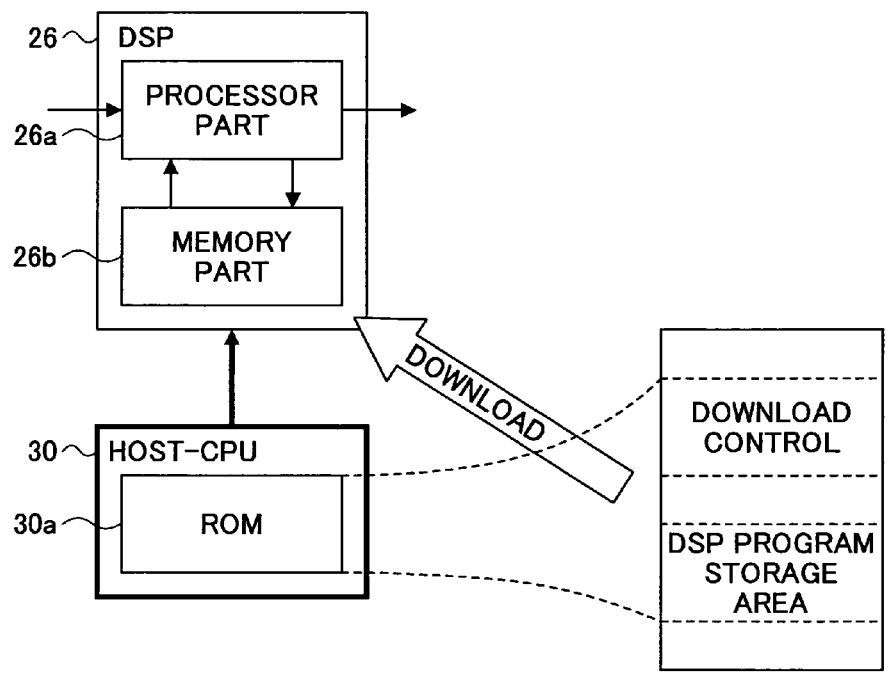
FIG. 17 is a block diagram of the pattern matching device constituted by a digital signal processor according to an example of the present invention.

In the present embodiment, the pattern matching device is constituted by a digital signal processor (DSP). FIG. 16 is a block diagram of the read-side image processing part 21 provided with a pattern matching device constituted by DSP. In FIG. 16, the digital signal processor 26 is located before the read-side image processing part 21 and after the image accumulating part 40. FIG. 17 is a block diagram of the pattern matching device constituted by a digital signal processor. In FIG. 17, the digital signal process (DSP) 26 comprises a processor part 26a and a memory (RAM) 26b. The processor part 26a performed an input of the digital image data signal, image data signal processing and an output of the image data signal. The memory 26b stores programs for controlling an operation of the processor 26a and also stores information regarding feature patterns. On the other hand, the main control part 30 of the digital copy machine has a memory (ROM) 30a which stores programs for controlling the DSP. The memory 30a also stores in a DSP program storing area the DSP control programs, information regarding various feature patterns and a download control program.

The main control part 30 changes an operation of the DSP 26 by selecting and downloading the DSP control program and information regarding one of the feature patterns in accordance with kinds of special documents.

According to the present embodiment, a hardware structure of the DSP 26 is fixed, and a prohibition of an image formation corresponding to a plurality of special documents can be achieved by merely changing the program in the fixed hardware structure.

Fourth Embodiment

In the present embodiment, if the pattern matching device is inactivated for some reasons such as, for example, a physical destruction or a functional destruction, the operation history is saved or a warning is given. A description will now be given below of the above-mentioned operations.

Figure 18:
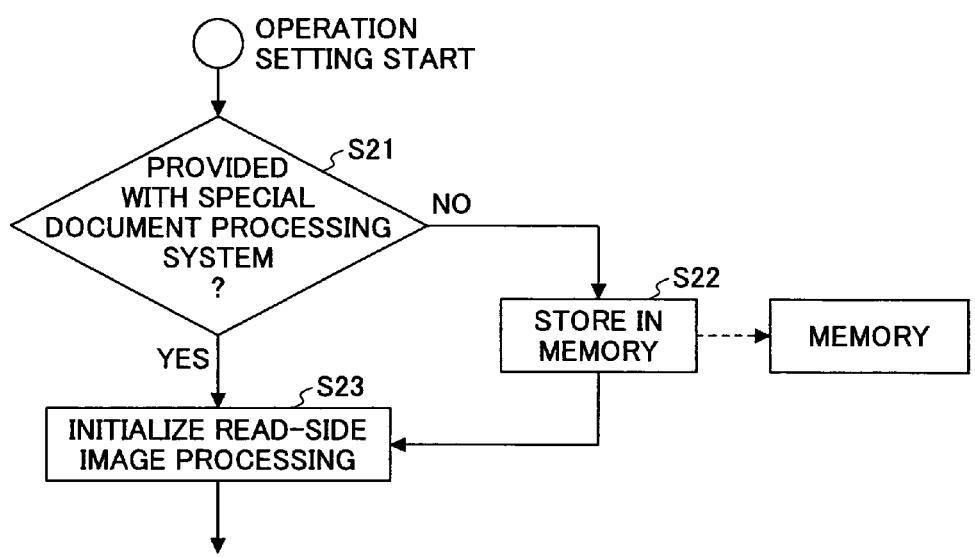
FIG. 18 is a flowchart of a procedure of saving an operation history of the pattern matching device according to an example of the present invention.

First, a description will be given of saving an operation history of the pattern matching device. FIG. 18 is a flowchart of a procedure of saving an operation history of the pattern matching device. In FIG. 18, when an operation history saving operation of the pattern matching device 23 (26) is started, the main control part 30 determines, in step S21, whether or not the pattern matching device 23 (26) is provided, that is, whether or not the special document processing system is destructed. If it is determined that the pattern matching device 23 (26) is inactivated or invalidated, information representing the state where the pattern matching device 23 (26) is inactivated or invalidated is stored in the memory in step S22. Then, an operation is set to the read-side image processing part 21 in step S23. On the other hand, if it is determined, in step S21, that the pattern matching device 23 (26) is activated or validated, the routine proceeds to step S23 where an operation is set to the read-side image processing part 21.

It should be noted that the determination as to whether or not the pattern matching device 23 is activated or inactivated can be made by whether or not the main control part 30 can detect the contents of ports of the pattern matching device 23 itself, the contents of the image processing part 20 containing the read-side image processing part 21 to which the pattern matching device 23 is connected or the identification (ID) information of a board on which the pattern matching device 23 is mounted.

Figure 19:
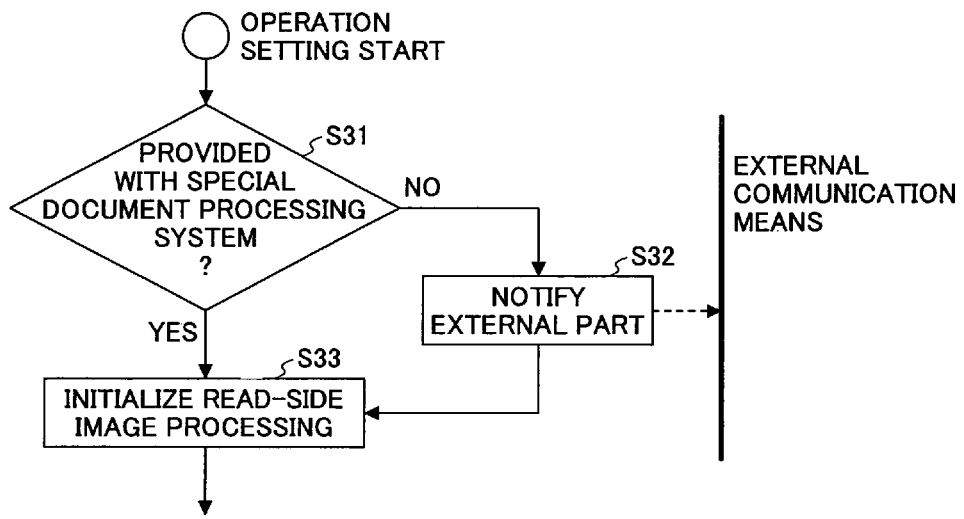
FIG. 19 is a flowchart of a procedure of giving a warning that the pattern matching device is inactivated or invalidated according to an example of the present invention.

A description will now be given of a warning that the pattern matching device is inactivated or invalidated. FIG. 19 is a flowchart of a procedure of giving a warning that the pattern matching device is inactivated or invalidated. In FIG. 19, when setting of an operation of the pattern matching device 23 (26) is started, the main control part 30 determines, in step S31, whether or not the pattern matching device 23 (26) is activated or validated without being destructed. If the pattern matching device 23 (26) is inactivated or invalidated, a notification is sent, in step S32, to an external part that the pattern matching device 23 (26) is inactivated or invalidated. Then, in step S33, an operation is set to the read-side image processing part 21. On the other hand, if it is determined, in step S31, that the pattern matching device 23 (26) is actuated or validated, the routine proceeds to step S33 where an operation is set to the read-side image processing part 21.

Figure 20:
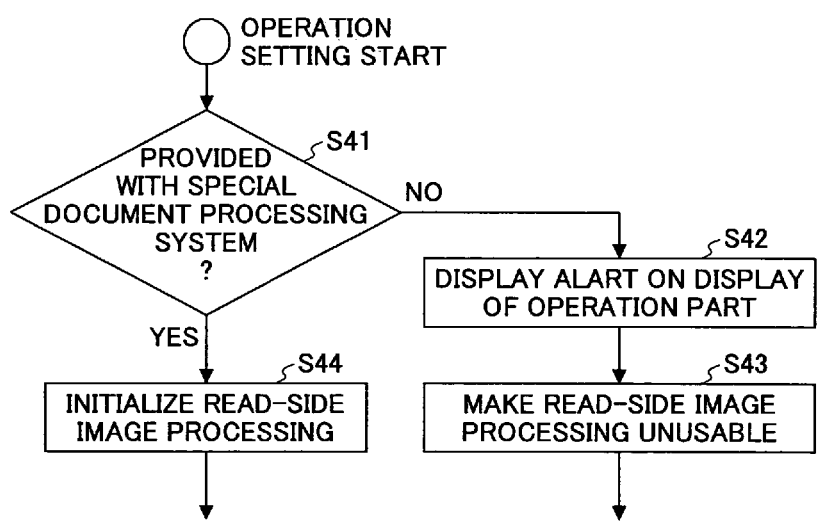
FIG. 20 is a flowchart of a procedure of giving a warning that the pattern matching device is inactivated or invalidated and also making the read-side image processing unusable according to an example of the present invention.

FIG. 20 is a flowchart of a procedure of giving a warning that the pattern matching device is inactivated or invalidated and also making the read-side image processing unusable. In FIG. 20, when the operation is started, the main control part 30 determines, in step S41, whether or not the pattern matching device 23 (26) is activated or validated without being destructed. If the pattern matching device 23 (26) is inactivated or invalidated, the fact of the inactivation or invalidation is displayed as an alert or warning on a display of the operation part 3 in step S42. Then, in step S43, the read-side image processing part 21 is made unusable. On the other hand, if it is determined, in step S41, that the pattern matching device 23 (26) is activated or validated, the routine proceeds to step S44 where an operation is set to the read-side image processing part 21.

Further, a description will be given of the determination as to whether or not the pattern matching device is activated or validated.

Fifth Embodiment

Figure 21:
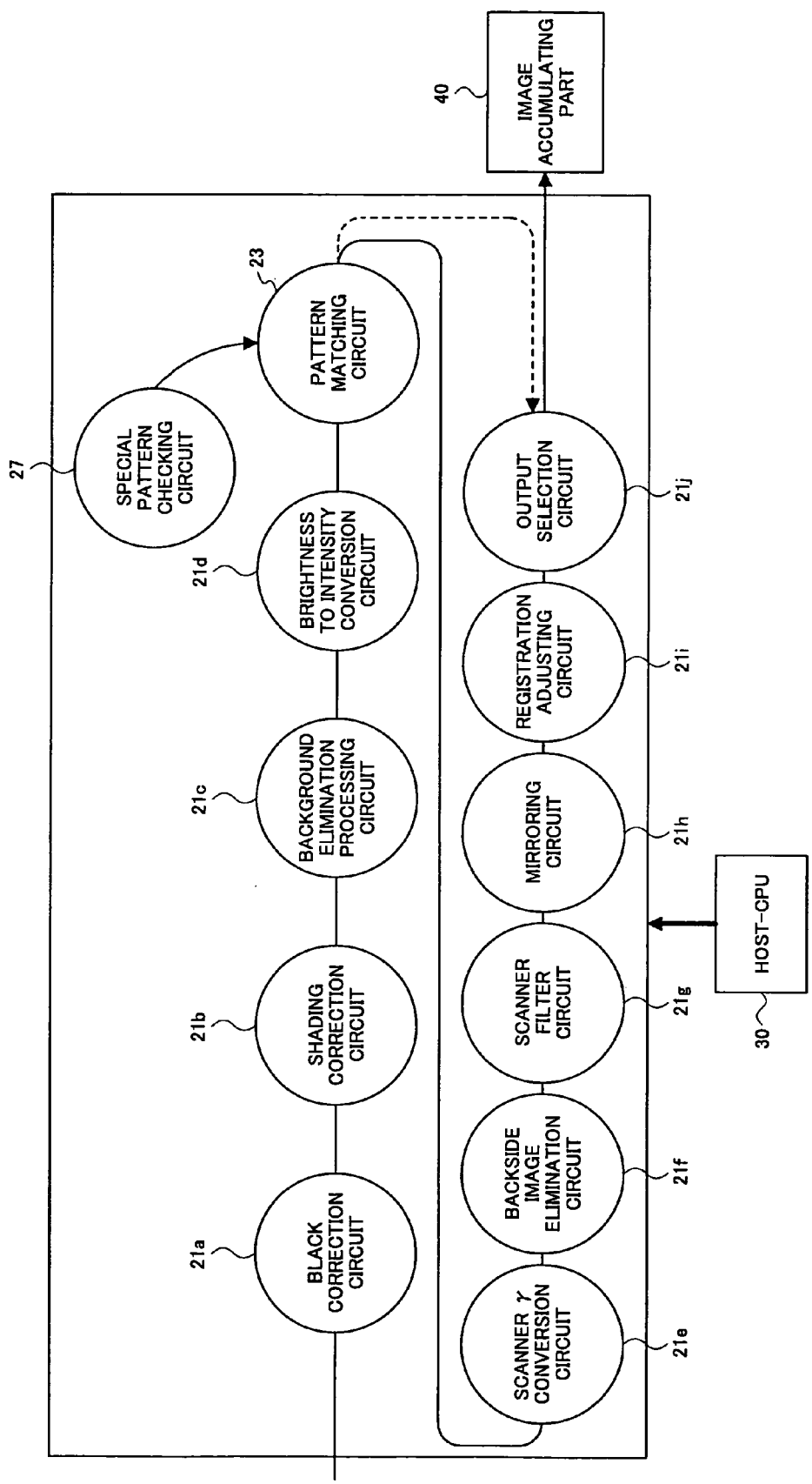
FIG. 21 is a block diagram of the read-side image processing part provided with a special pattern checking circuit according to an example of the present invention.

In the present embodiment, a special pattern checking part exchanges feature patterns of special documents and a control part determines whether the pattern matching device is activated or validated. Accordingly, the digital copy machine comprises the special pattern checking part. FIG. 21 is a block diagram of the read-side image processing part provided with a special pattern checking circuit. As shown in FIG. 21, the special pattern checking circuit 27 has information regarding special patterns for checking validity in a memory attached thereto so as to exchange the information regarding the special patterns with the pattern matching circuit 23a of the pattern matching device 23. The main control part 30 determines whether or not the exchange is carried out normally so as to check validity of the pattern matching device.

Figure 22:
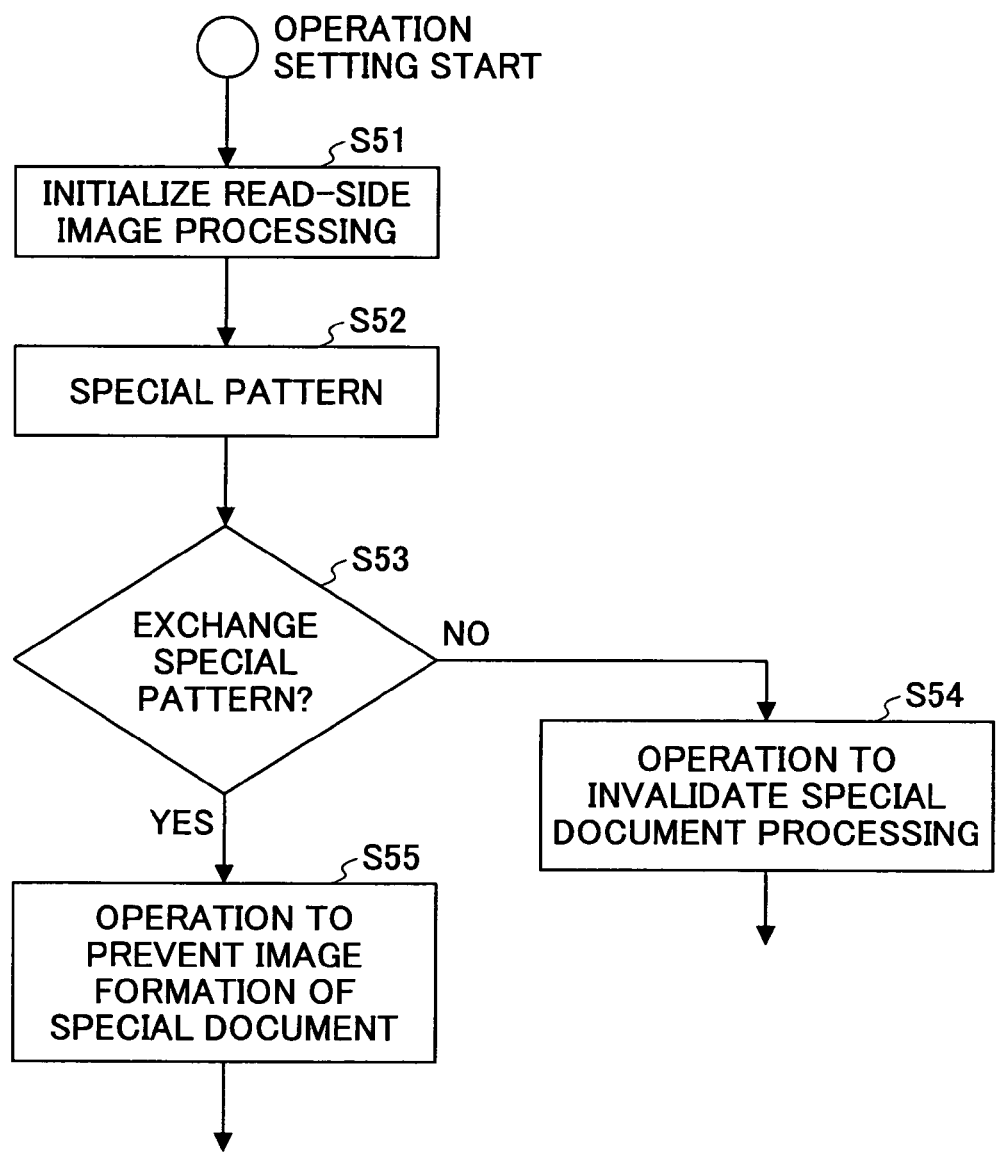
FIG. 22 is a flowchart of a procedure of checking validity of the pattern matching device according to an example of the present invention.

FIG. 22 is a flowchart of a procedure of checking validity of the pattern matching device. In FIG. 22, when the operation is started, the main control part 30 initializes, in step S51, the read-side image processing part 21. Then, the main control part reads the information regarding the special patterns for checking validity from the memory attached to the special pattern checking circuit 27, and causes the pattern matching circuit 23a to send the information regarding the special patterns. The pattern matching circuit 23a returns, when normally operated, the information regarding the special patterns to the special pattern checking circuit 27. The main control part 30 determines, in step S53, whether or not the exchange of the information is performed. If the exchange is performed (Yes of step S53), the main control part 30 performs, in step S55, a normal process of preventing an image formation of a special document. On the other hand, if it is determined that the exchange is not performed (No of step S53), the control part 30 performs, in step S54, an operation of a case where the special document processing is inactivated or invalidated, that is, an operation of giving a warning such as mentioned in the fourth embodiment.

The present invention is not limited to the specifically disclosed embodiments, and variations and modifications may be made without departing from the scope of the present invention.

The present application is based on Japanese priority application No. 2004-029854 filed Feb. 5, 2004, the entire contents of which are hereby incorporated herein by reference.

What is claimed is:

1. An image processing apparatus, comprising:
    a circuit for processing image data;
    at least one pattern matching circuit configured to prevent an image formation of a specified document;
    a detection unit configured to detect an operation of said pattern matching circuit;
    a special pattern checking circuit containing information regarding special patterns of the specified document for checking validity in a memory attached thereto so as to exchange information regarding the special patterns with the pattern matching circuit; and
    at least one of a storage unit configured to store information regarding a state of operation in accordance with a result of the detection, an announcing unit configured to announce the state of operation in accordance with a result of the detection, and a stopping unit configured to stop an image processing operation in accordance with a result of the detection, wherein
    said pattern matching circuit is detachably attached to said circuit for processing image data.

2. The image processing apparatus as claimed in claim 1, wherein a plurality of said pattern matching circuits are provided so that one of said pattern matching circuits is selectable in accordance with the specified document.

3. The image processing apparatus as claimed in claim 1, wherein said pattern matching circuit includes a processor and a memory, and is operated according to a process program that corresponds to the specified document and is stored in said memory.

4. The image processing apparatus as claimed in claim 1, wherein said detection unit configured to detect an operation of said pattern matching circuit includes means for detecting an exchanging function to exchange specific information of said pattern matching circuit.

5. An image forming apparatus, comprising:
    image forming means for forming a visible image based on image data; and
    an image processing apparatus including:
        a circuit for processing the image data,
        at least one pattern matching circuit configured to prevent an image formation of a specified document,
        a detection unit configured to detect an operation of said pattern matching circuit,
        a special pattern checking circuit containing information regarding special patterns of the specified document for checking validity in a memory attached thereto so as to exchange information regarding the special patterns with the pattern matching circuit, and
        at least one of a storage unit configured to store information regarding a state of operation in accordance with a result of the detection, an announcing unit configured to announce the state of operation in accordance with a result of the detection, and a stopping unit configured to stop an image processing operation in accordance with a result of the detection, wherein
        said pattern matching circuit is detachably attached to said circuit for processing image data.

6. The image forming apparatus as claimed in claim 5, wherein a plurality of said pattern matching circuits are provided so that one of said pattern matching circuits is selectable in accordance with the specified document.

7. The image forming apparatus as claimed in claim 5, wherein said pattern matching circuit includes a processor and a memory, and is operated according to a process program that corresponds to the specified document and is stored in said memory.

8. The image forming apparatus as claimed in claim 5, wherein said detection unit configured to detect an operation of said pattern matching circuit includes means for detecting an exchanging function to exchange specific information of said pattern matching circuit.

* * * * *